United States Patent [19]
Coffield

[11] Patent Number: 6,019,428
[45] Date of Patent: Feb. 1, 2000

[54] SEAT BOLSTER ADJUSTMENT ASSEMBLY

[75] Inventor: Timothy P. Coffield, Grand Rapids, Mich.

[73] Assignee: Cascade Engineering, Grand Rapids, Mich.

[21] Appl. No.: 09/201,960

[22] Filed: Dec. 1, 1998

Related U.S. Application Data

[62] Division of application No. 08/895,016, Jul. 16, 1997, Pat. No. 5,938,284.
[60] Provisional application No. 60/022,221, Jul. 19, 1996.

[51] Int. Cl.⁷ .................................................. A47C 3/025
[52] U.S. Cl. ..................................... 297/284.9; 297/284.1
[58] Field of Search ............................... 297/284.1, 284.9, 297/463.1, 284.3, 452.23, 452.21, 452.25, 452.29, 452.33, 452.34, 452.35, 452.36, 452.4

[56] References Cited

U.S. PATENT DOCUMENTS

| | | |
|---|---|---|
| 1,527,754 | 2/1925 | Simon . |
| 2,822,034 | 2/1958 | Dixon . |
| 3,121,592 | 2/1964 | Anderson . |
| 3,608,960 | 9/1971 | Sherman . |
| 3,982,786 | 9/1976 | Burgin et al. . |
| 3,983,640 | 10/1976 | Cardullo et al. . |
| 3,984,886 | 10/1976 | Keeton . |
| 4,370,000 | 1/1983 | Kazaoka et al. . |
| 4,455,047 | 6/1984 | Watanabe . |
| 4,536,030 | 8/1985 | Sakurada et al. . |
| 4,585,272 | 4/1986 | Ballarini . |
| 4,673,212 | 6/1987 | Mayer . |
| 4,678,230 | 7/1987 | Winkle . |
| 4,696,514 | 9/1987 | Maloney . |
| 4,720,146 | 1/1988 | Mawbey et al. . |
| 4,756,574 | 7/1988 | Andres et al. . |
| 4,778,218 | 10/1988 | Suman . |
| 4,804,221 | 2/1989 | Saiki . |
| 4,883,318 | 11/1989 | Adachi . |
| 4,913,491 | 4/1990 | Mizuno et al. . |
| 4,915,447 | 4/1990 | Shovar . |
| 4,938,529 | 7/1990 | Fourrey . |
| 4,965,899 | 10/1990 | Sekido et al. . |
| 5,018,786 | 5/1991 | Goldstein et al. . |
| 5,022,709 | 6/1991 | Marchino . |
| 5,046,687 | 9/1991 | Herndon . |
| 5,082,326 | 1/1992 | Sekido et al. . |
| 5,137,329 | 8/1992 | Neale . |
| 5,240,308 | 8/1993 | Goldstein et al. . |
| 5,280,997 | 1/1994 | Andres et al. . |
| 5,316,375 | 5/1994 | Breen . |
| 5,328,245 | 7/1994 | Marks et al. . |
| 5,335,965 | 8/1994 | Sessini . |
| 5,411,316 | 5/1995 | Lovegrove et al. . |
| 5,419,614 | 5/1995 | Richards et al. . |
| 5,425,569 | 6/1995 | Hayes . |
| 5,516,195 | 5/1996 | Canteleux . |
| 5,547,251 | 8/1996 | Axelson . |
| 5,681,083 | 10/1997 | Nelson et al. . |
| 5,681,084 | 10/1997 | Yoneda . |

FOREIGN PATENT DOCUMENTS

| | | |
|---|---|---|
| 0229737 | 7/1987 | European Pat. Off. . |
| 2097577 | of 0000 | France . |
| 2740268 | of 0000 | Germany . |
| 4034121 | of 0000 | Germany . |
| 2606380 | 8/1977 | Germany . |
| 3025916 | 1/1982 | Germany . |
| 3707926 | 9/1988 | Germany . |
| 90141113 | 1/1991 | Germany . |
| 0205238 | 12/1982 | Japan . |
| 0135835 | 6/1986 | Japan . |
| 2-82905 | 2/1990 | Japan . |

Primary Examiner—Milton Nelson, Jr.
Attorney, Agent, or Firm—Van Dyke, Gardner, Linn & Burkhart, LLP

[57] ABSTRACT

A seat bolster adjustment assembly includes a bolster moveably mounted on a seat back with a bolster adjustment mechanism adapted to adjust and control the support provided by the bolster. The bolster adjustment mechanism may be mounted on the back side of the seat back, and may include a moveable positioning member between adjacent ribs in order to form a stop limit or positioning element when contacted by the ribs. This bolster adjustment positioning mechanism may include an adjustable brace moveable toward and away from a forward edge of the bolster to thereby adjust the stiffness of the bolster.

6 Claims, 6 Drawing Sheets

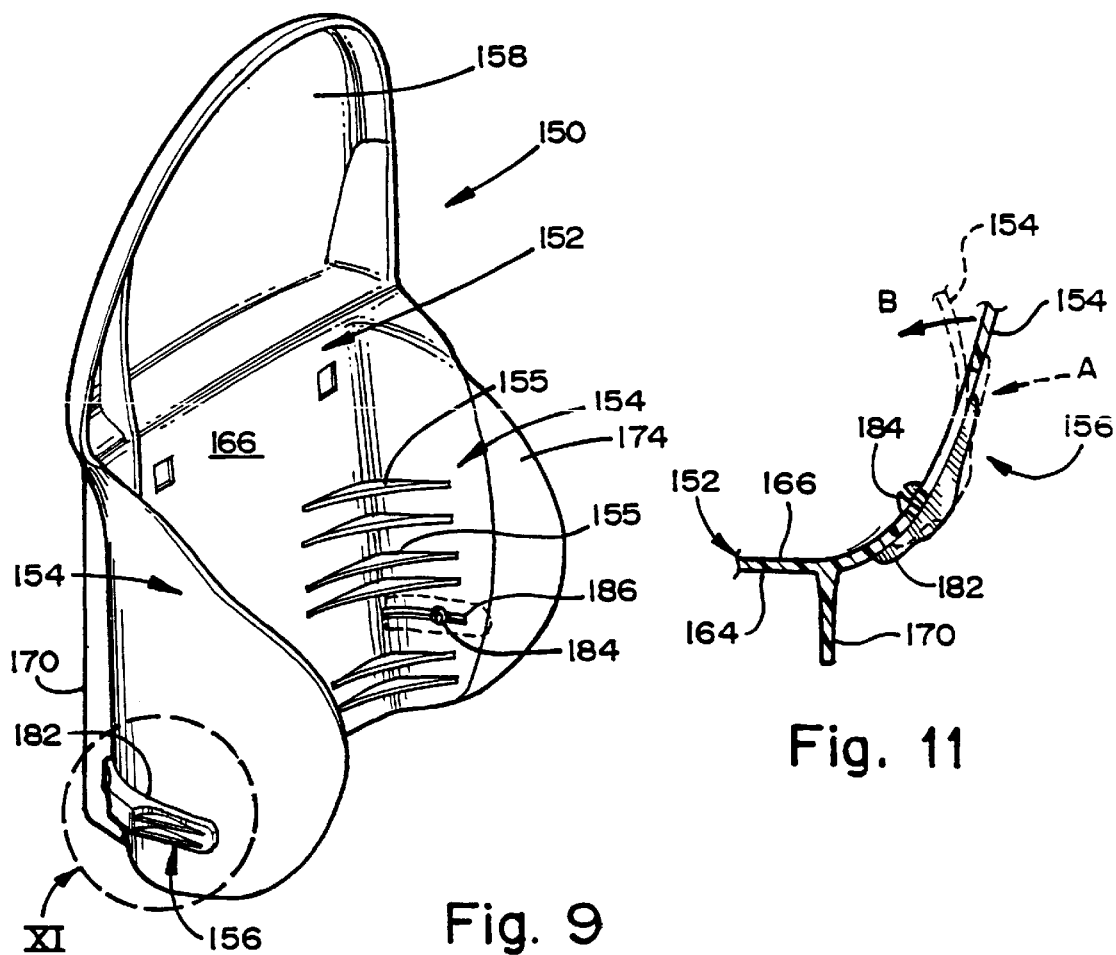
Fig. 9
Fig. 11
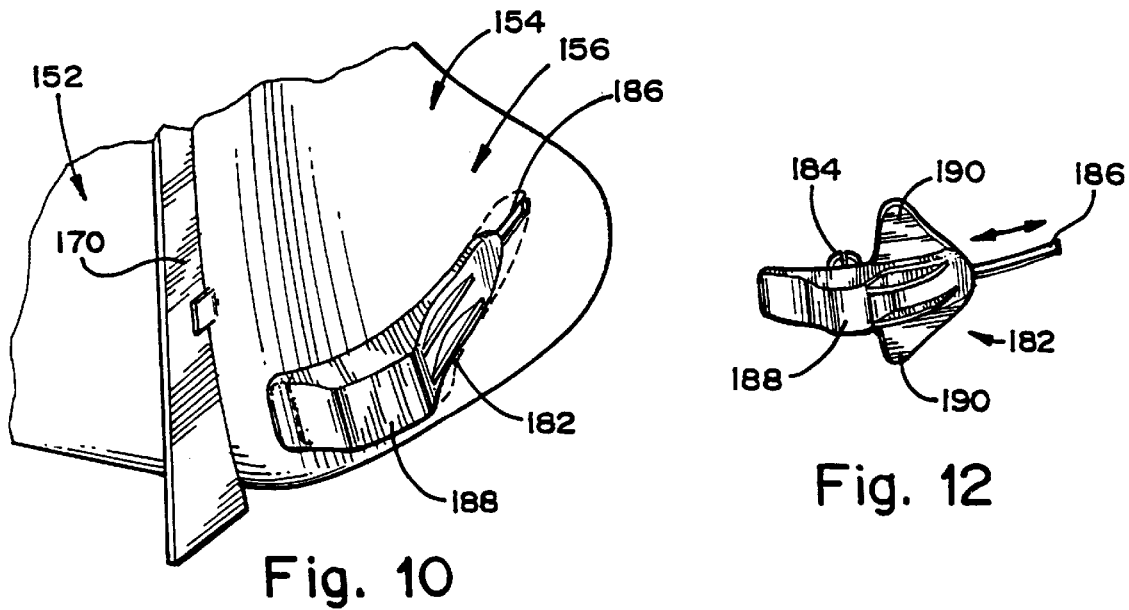
Fig. 10
Fig. 12

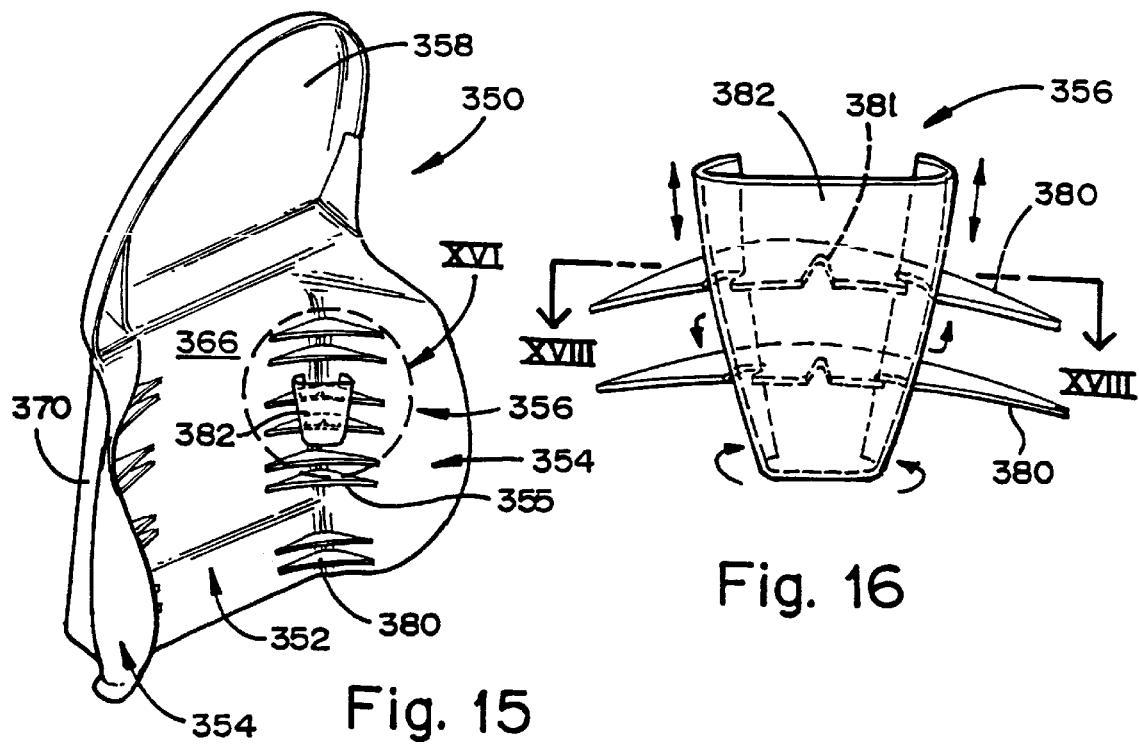
Fig. 15
Fig. 16
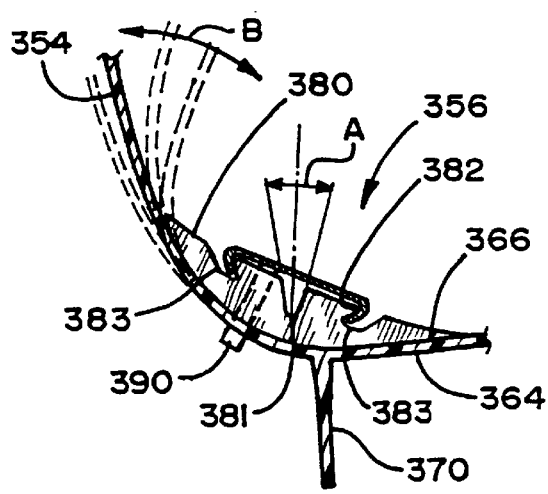
Fig. 17
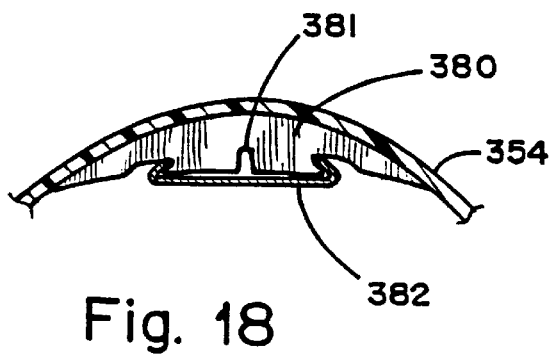
Fig. 18

SEAT BOLSTER ADJUSTMENT ASSEMBLY

CROSS REFERENCE TO RELATED APPLICATIONS

This application is a division of U.S. application Ser. No. 08/895,016, now U.S. Pat. No. 5,938,284, filed Jul. 16, 1997, of Timothy P. Coffield entitled SEAT BOLSTER ADJUSTMENT ASSEMBLY, which in turn claims priority to U.S. Provisional Application Ser. No. 60/022,221, filed Jul. 19, 1996.

BACKGROUND OF THE INVENTION

The present invention relates to seating, and in particular, to adjustable seating.

Seating having a myriad of different adjustment features has been utilized in various environments, such as, for example, office furniture, automotive seats, marine seats, and the like. Such adjustment mechanisms have been employed in desk or task chairs, benches, fixed mounted bucket seats, swivel mounted captain's chairs, to name but a few examples. Among the various mechanisms that have been developed for seat adjustment are a variety of adjustment mechanisms for adjusting a seat back position relative to the seat support. Some mechanisms permit adjustment of the seat back independently of motion of the seat, while others operate to provide simultaneous adjustment of the back and seat. A common type of adjustment mechanism is used to adjust the tilt angle of the seat back, either independently or in common with the seat. Other adjustment mechanisms provide for a lumbar support adjustment in the seat back in order to provide either a greater or lesser degree of support to the lumbar region of the user's back.

In the automotive field, most seat adjustment devices were originally mechanical in operation and control. However, increasing numbers of automotive seating adjustment devices are electrically controlled and operated, and incorporate a greater number of different adjustment options in a single seat. Office seating remains predominately mechanical in operation and control, but a variety of automated controls have been proposed or developed, such as, seating adjustment devices utilizing pneumatic bladders and controls.

Certain seating provides bolsters at the side of the seat in order to provide some degree of lateral support to the user. Typically, bolsters extend along the edges of a seat back, but may also be incorporated along the lateral edges of a seat support. The use of bolsters is particularly popular in automotive seating, and, in particular, in vehicles considered to be in a sports car class where it is desirable to provide a seat that is perceived to conform more to the user's body.

SUMMARY OF THE INVENTION

The present invention is embodied in a seat bolster assembly and seats incorporating such an adjustable bolster assembly. Preferably, the bolster adjustment assembly is incorporated into the seat back and includes a mechanism that selectively adjusts the firmness of support provided by the bolsters or adjusts the position of the bolsters relative to the seat back and thus the support provided by the bolsters. The seat bolsters are flexibly or pivotally mounted to the seat back so as to permit a degree of relative movement or flexing between the bolsters and seat back. A series of spaced ribs on the seat back and bolster form stops, while a positioning element is slidably mounted between these ribs or stops. The positioning element is located so as to be contacted by the ribs and stop the relative movement between the bolster and seat back at a selected position or degree of relative movement. The positioning element provides a plurality of different settings at which the ribs are stopped at different positions, and, thus, moving the positioning element between these settings provides for the selective adjustment of the bolster position or stiffness.

Most preferably, the positioning member is mounted on the back surface of the seat back/bolster, and is an elongated bar made up of a series of wedges or blocks having different dimensions that are selectively moved between the spaced ribs. In an alternative preferred embodiment, the bolsters are flexibly mounted on the seat back, and a reinforcing element is moveably mounted on the seat back bolster so as to slide laterally between a series of positions along the outer surface of the bolster. The adjustment member forms a reinforcing brace in that region in which the adjustment member is located. The adjustable positioning of the adjustment member along the seat back/bolster surface provides the user with the ability to select the position and thus the firmness of support provided by the bolster.

The adjustment mechanism provides a structure that can be manufactured from lightweight materials and provides an uncomplicated, easy-to-assemble structure. The adjustment mechanism provides a high degree of adjustability to the seat and bolster, and can be incorporated into a wide variety of seats. With the adjustment mechanism mounted on the back face of the seat back and bolster, the adjustment mechanism can be incorporated into a lightweight, relatively thin seat assembly, without the need for padding between the user and the adjustment mechanism. As one example, the bolster adjustment mechanism can be incorporated into a seat made up of a frame over which a thin membrane or fabric is stretched, so that cushions or thick padding is not required. These and other benefits and advantages will be recognized by one skilled in the art from the disclosure which follows, including the specification, claims, and drawings appended hereto.

BRIEF DESCRIPTION OF THE DRAWINGS

FIG. 9 is a fragmentary, perspective view of a seat back with bolsters and an alternative bolster adjustment assembly forming an alternative preferred embodiment of the invention;

FIG. 10 is a fragmentary, rear perspective view of the alternative bolster adjustment assembly taken in region XI of FIG. 9;

FIG. 11 is a fragmentary, cross-sectional plan view of the seat back, bolster, and bolster adjustment assembly of FIG. 10;

FIG. 12 is an alternative preferred embodiment of the bolster adjustment assembly shown in FIG. 9 and forming another alternative embodiment of the invention;

FIG. 15 is a perspective view of a seat back with bolsters and an alternative bolster adjustment assembly forming still another alternative preferred embodiment of the invention;

FIG. 16 is a fragmentary, perspective view of the alternative bolster adjustment assembly taken in region XVI of FIG. 15;

FIG. 17 is a fragmentary, cross-sectional plan view of the seat back, bolsters, and bolster adjustment assembly of FIG. 15;

FIG. 18 is a fragmentary, cross-sectional plan view of the seat back, bolster, and bolster adjustment assembly taken along plane XVIII—XVIII of FIG. 16;

DETAILED DESCRIPTION OF THE PREFERRED EMBODIMENTS

Figure 1:
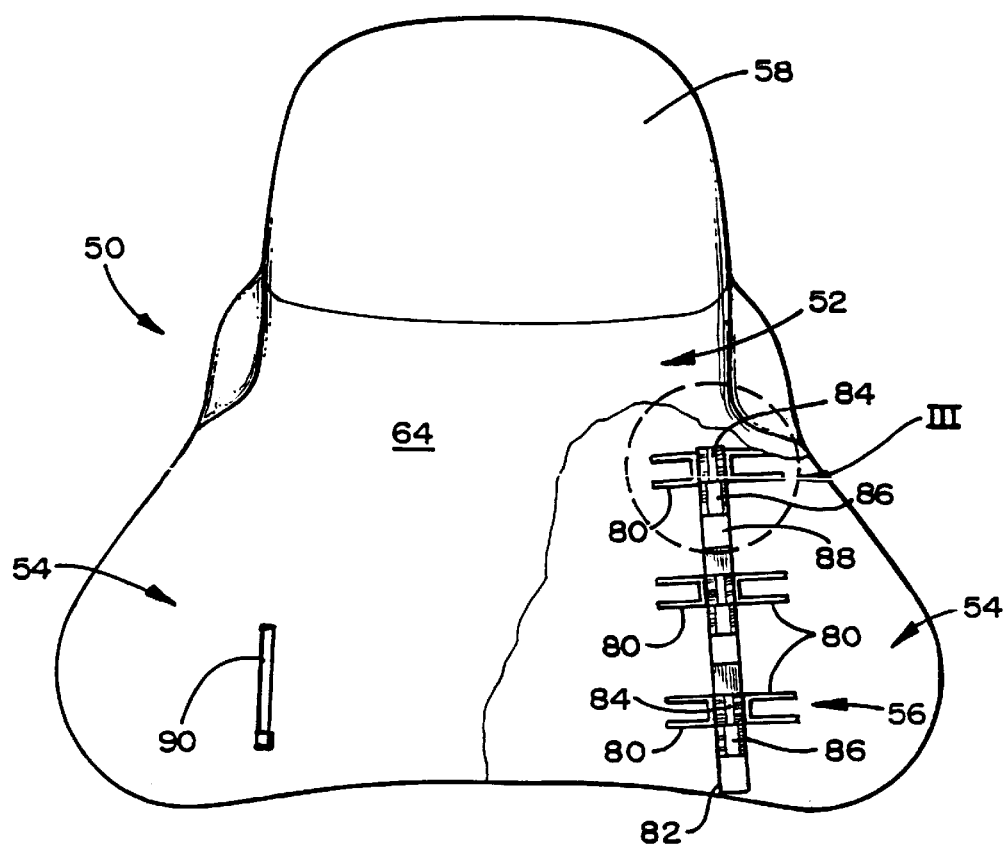
FIG. 1 is a fragmentary, rear elevational view of a seat incorporating a bolster adjustment assembly forming a preferred embodiment of the invention.
Figure 2:
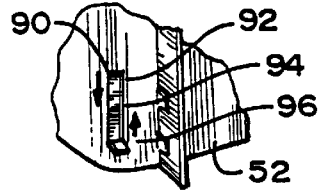
FIG. 2 is a fragmentary, perspective view of an adjustment control for the bolster adjustment assembly of FIG. 1.
Figure 3:
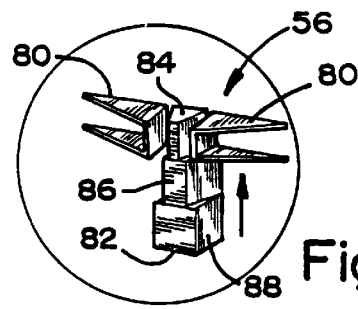
FIG. 3 is a fragmentary, perspective view of the bolster adjustment assembly taken in region III of FIG. 1.
Figure 4:
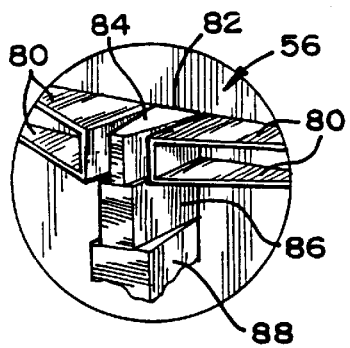
FIG. 4 is a fragmentary, perspective view of the bolster adjustment assembly of FIG. 3, shown in a minimum or no firmness setting.
Figure 5:
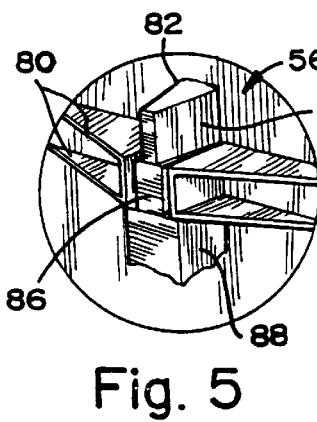
FIG. 5 is a fragmentary, perspective view of the bolster adjustment assembly of FIG. 3, shown in a medium or low firmness setting.
Figure 6:
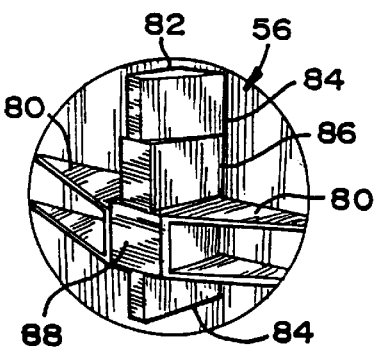
FIG. 6 is a fragmentary, perspective view of the bolster adjustment assembly of FIG. 3, shown in a maximum or high firmness setting.

The present invention is embodied in a bolster adjustment assembly and a seat incorporating a bolster adjustment assembly, a preferred form of which is shown in FIG. 1. A seat assembly 50 includes a seat back 52 and a pair of bolsters 54. A bolster adjustment mechanism 56 is used to selectively adjust the relative flexibility, stiffness, or position of bolsters 54 relative to seat back 52. Bolster adjustment mechanism 56 is, thus, used to select and adjust the degree of lateral support or firmness provided by bolsters 54 to a person seated on seat assembly 50.

Figure 7:
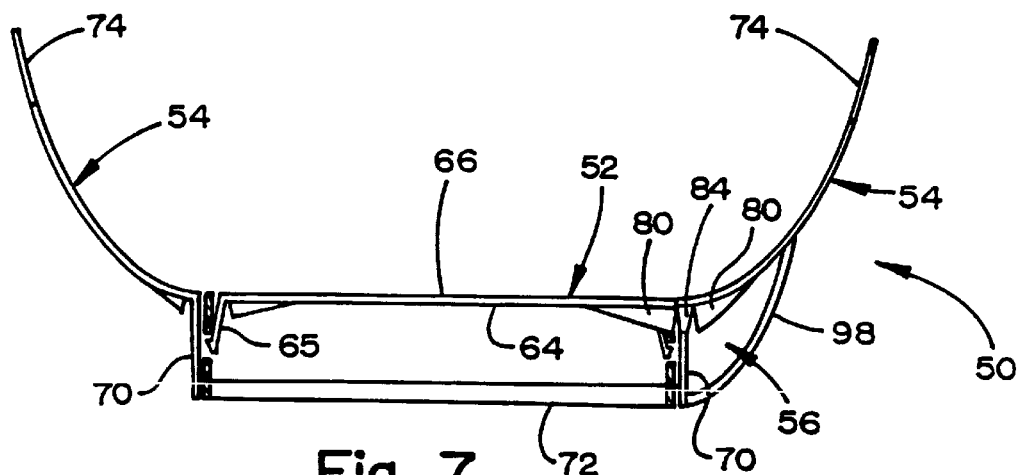
FIG. 7 is a fragmentary, plan view of the seat and bolster adjustment assembly of FIG. 1.
Figure 8:
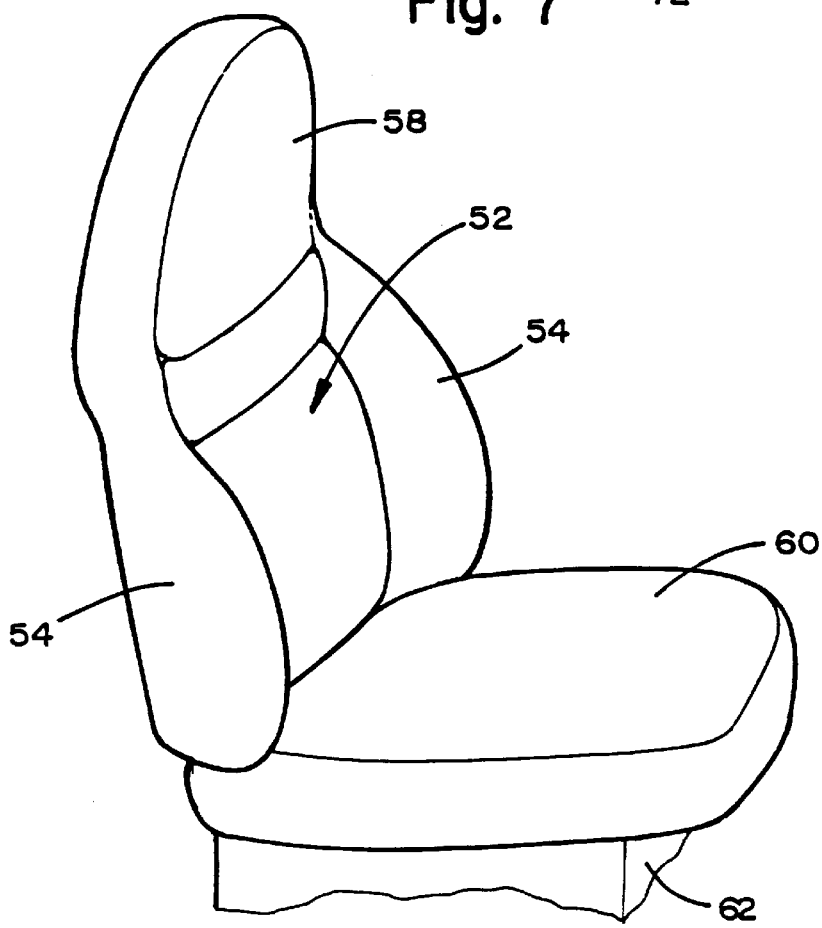
FIG. 8 is a fragmentary, perspective view of an alternative seat embodiment incorporating bolster adjustment assembly of FIG. 1.

Seat assembly 50 includes a headrest 58 and a support or seat 60 (FIG. 8). Seat 60 is mounted on a base 62. Base 62 also provides a base for seat back 52. Depending upon the intended use and operation of seat assembly 50, seat back 52 may be mounted to base 62 by way of seat 60, or, alternatively, may be mounted directly to base 62. As shown in FIGS. 1–8, one preferred usage of seat assembly 50 is in automotive seating. Alternatively, seat assembly 50 may be configured as required to meet the intended function of the seat, such as office seating, residential seating, marine seating, or the like. In the preferred automotive applications, seat back 52 may be pivotally, or tiltably, mounted relative to seat 60 in order to permit seat back 52 to be tilted forward and back. In an office or commercial environment, a variety of additional adjustments and controls may be incorporated into seat assembly 50. While seat assembly 50 is shown with bolsters 54 mounted to and forming an extension of seat back 52, alternatively, bolsters 54 may be incorporated along the lateral edges of seat 60, either alone or in conjunction with a set of bolsters on seat back 52.

In preferred form, seat assembly 50 may be made up of one or more polymeric shells. Alternatively, seat assembly 50 is assembled from a shape-defining frame over which a fabric or other membrane is stretched and mounted. In preferred form, seat assembly 50 may also include cushioning or upholstery as shown in FIG. 8, although an exposed exterior shell or frame and membrane construction may also incorporate bolster adjustment mechanism 56.

Seat back 52 provides a back face or surface 64 and a front face or surface 66 (FIG. 7). Preferably, bolster adjustment mechanism 56 is mounted on back face 64 in order to leave front face 66 unobstructed. A series of integrally molded mounting hooks 68 project rearwardly from seat back face 64 adjacent a spaced pair of integrally molded vertical reinforcing ribs 70. A frame 72 extends upwardly from seat base 62. Mounting hooks 68 snap into frame 72 and mount seat back 52 in an upright position on supporting frame 72. Seat back 52 is preferably a flexible polymeric material, and most preferably a polypropylene material. Frame 72 is preferably metal, and most preferably a magnesium framework.

Preferably, bolsters 54 are integrally formed with seat back 52, most preferably molded from polyurethane. In preferred form, the thickness of bolsters 54 tapers from seat back 52 to a thinner forward edge region 74. Thus, bolsters 54 are molded to include a higher degree of flexibility in forward edge region 74. Alternatively, flexible forward edge region 74 is formed of a material having a higher degree of flexibility than the remainder of bolsters 54, in order to provide an increasing degree of flexure toward the forward end of bolsters 54. A preferred material for flexible forward edge region 74 is a Santoprene material, and thinner forward edge region 74 tapers to a thickness of about 0.06 inch.

A bolster adjustment assembly 56 is preferably provided for each bolster 54 (FIGS. 3–7). Bolster adjustment mechanism 56 includes a series of integrally molded, spaced ribs or stops 80 that are vertically arrayed along seat back 52. Ribs 80 are preferably positioned at the transition between back 52 and bolster 54, so that one rib 80 of each pair extends from the general region of seat back 62, and the other rib 80 projects from the general region of bolster 54. A rib shunt or bar 82 is slidably mounted between spaced ribs 80. Rib shunt 82 is moveably mounted so as to slide along a vertical axis. An example of a slidable mount for rib shunt 82 is a pair of converging tracks integrally molded on seat back 52 or bolster 54 in order to have a "C" shaped cross-section and receive a raised lobe or lobes extending vertically along the mating surface of rib shunt 82. In preferred form, the shell wall thickness forming seat back 52 and bolsters 54 smoothly transitions yet provides flexible movement between seat back 52 and bolster 54. Alternatively, a generally vertical notch may be formed in the area between seat back 52 and bolster 54 in order to provide a higher degree of flexibility and form a living hinge between seat back 52 and bolster 54. As still another alternative, seat back 52 and bolster 54 may be separate elements coupled by hinges.

Rib shunt 82 has configured side surfaces so as to form a vertically arrayed series of wedge-shaped blocks. Preferably, each sequence of the configured blocks of rib shunt 82 includes an upper narrow wedge or block 84, a middle intermediate wedge or block 86, and a lower wide wedge or block 88. Upper narrow wedge 84 has a high degree of taper so as to provide a narrow wedge overall. When rib shunt 82 is slid so as to position narrow wedge 84 between ribs 80 (FIG. 4), the narrowest angular spacing between adjacent ribs 80 is provided. When intermediate wedge 86 is positioned between ribs 80 (FIG. 5), a lesser degree of angular spacing between ribs 80 is provided.

When rib shunt 82 is shifted so as to position wide wedge 88 between ribs 80 (FIG. 6), the greatest angular spacing between ribs 80 is provided. As shown in FIG. 1, spaced pairs of ribs 80 are vertically arrayed so that a narrow wedge section 84 is positioned between each pair of ribs 80 simultaneously. The same sequence and adjustment spacing of wedges 84, 86, 88 is, thus, maintained by rib shunt 82 along the height of back 52. An adjustment lever 90 extends rearwardly from rib shunt 82. Adjustment lever 90 provides access for a user to vertically slide rib shunt 82 between various settings. Lever 90, therefore, adjusts between a minimal or no firmness setting 92, an intermediate or low support setting 94, and a maximum or high support setting 96. Separate levers 90 may be provided for each rib shunt 92, or a single lever 90 coupled to both rib shunts.

A cushion or padding 98 is preferably mounted about ribs 80 and rib shunt 82 in order to conceal bolster adjustment mechanism 56. Cushion 98 may also provide impact cushioning in certain environments, such as automotive seating, as well as provides a safety enclosure about the operative elements of bolster adjustment mechanism 56.

Preferably, rib shunt 82 is formed from a relatively rigid polymeric material. Rib shunt 82, therefore, provides a rigid stop for ribs 80. Alternatively, rib shunt 82 may be formed from an elastomeric or resiliently compressible material. Wedges 84, 86, 88 are compressed between ribs 80 when a person presses against bolster 54, so that rib shunt 82 provides a cushioned support to bolster 54.

Preferably, the dimensions and configuration of wedges 84, 86, 88 dictate the adjustability of bolster support provided by adjustment mechanism 54. Alternatively, rib shunt 82 may be formed from elastomeric or compressible materials having different hardnesses or durometers. By varying the durometer along rib shunt 82, the degree of bolster support may be varied by vertically shifting rib shunt 82 in order to change the durometer of material located between ribs 80. In this embodiment, rib shunt 82 may, therefore, have a constant configuration along its length, with support adjustment being provided solely by different hardnesses of the rib shunt material. Alternatively, a combination of varied configurations and hardness may be incorporated into rib shunt 82. By way of example, as shown in FIGS. 3–6, upper narrow wedge 84 may be formed from a highly compressible, resilient material, while intermediate wedge 86 is formed from a material having a medium degree of resilient compressibility, and lower wide wedge 88 may be formed from a material of low resilient compressibility.

An alternative preferred seat assembly 150 is shown in FIG. 9. Elements of seat assembly 150 are in common with corresponding elements of assembly 50 unless referenced otherwise. Seat assembly 150 includes a seat back 152, a pair of bolsters 154, and bolster adjustment mechanism 156. Seat back 152 includes a back face 164 and a front face 166. Seat back 152 is preferably a molded plastic polypropylene shell or frame with vertical ribs 170 and mounted on a metal frame. Bolsters 154 are preferably integrally molded with seat back 152 from a polypropylene material. Alternatively, a forward edge area 174 may be molded from a Santoprene material. Integral bolsters 154 are resiliently flexible relative to seat back 152. Alternatively, a series of horizontal reinforcing ribs 155 are molded between back 152 and bolster 154. Even with reinforcing ribs 155, however, bolster 154 maintains some degree of flexibility relative to seat back 152.

Bolster adjustment mechanism 156 includes an elongated adjustable brace or cuff 182. Adjustable brace 182 is slidably mounted on the back surface of bolster 154. Adjustable brace 182 has a curved configuration so as to mate with the curved back surface of bolster 154. Adjustable brace 182 includes a mounting peg 184 that is received through a generally horizontal or lateral track slot 186 on bolster 154. Mounting peg 184 is a split peg with an enlarged head so as to permit assembly by snapping adjustable brace 182 through track slot 186. Adjustable brace 182 is laterally slidable along track slot 186 so as to adjust the reinforcing position of brace 182 on bolster 154. A raised land 188 on adjustable rib 182 provides a surface for a user to manually push brace 182 along track slot 186. As adjustable brace 182 is pushed forward along track slot 186, brace 182 provides increased reinforcement in the forward region of bolster 154. The positioning of adjustable brace 182 reduces the flexibility or movement of bolster 154 and, thus, increases the stiffness and support provided by bolster 154. The arcuate configuration of brace 182 may be formed so as to force forward edges 174 of bolsters 154 inwardly. As shown in FIG. 11, as brace 182 is moved forward to position "A" (shown in phantom), bolster 154 is forced inward in the direction of arrow "B." The inward movement of forward edges 174 provides increased bolster support by virtue of the bolster's position.

An alternative adjustable brace 182 is shown in FIG. 12. In the alternative adjustable brace 182 of FIG. 12, a pair of enlarged flanges 190 extend vertically from the body of brace 182. Enlarged flanges 190 provide increased stiffening reinforcement in the regions vertically adjacent the elongated body of adjustable brace 182.

Figure 13:
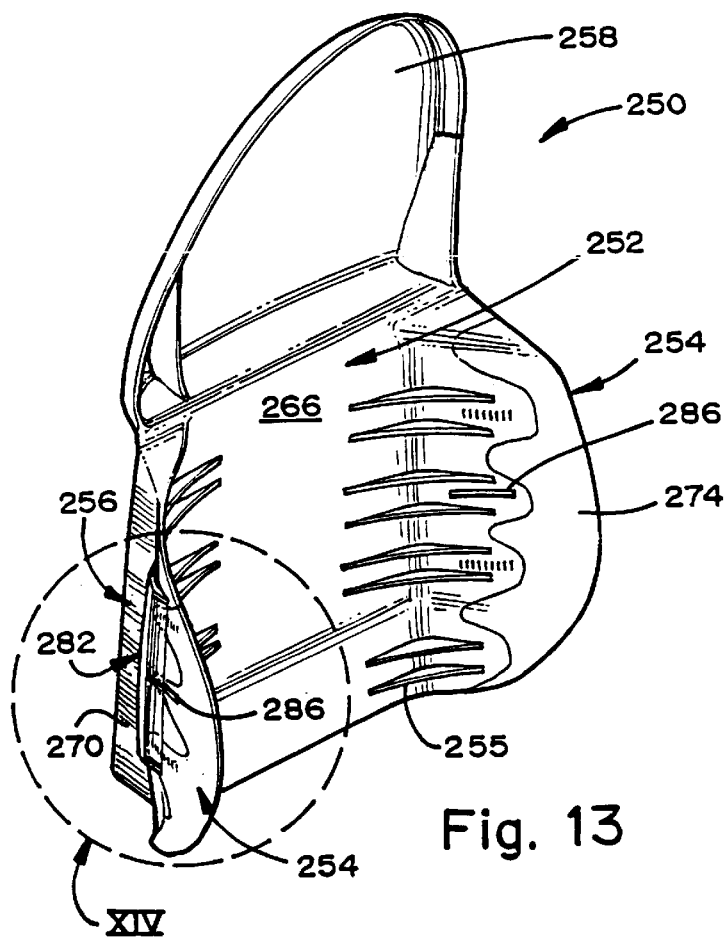
FIG. 13 is a fragmentary, perspective view of a seat back with bolsters and an alternative bolster adjustment assembly forming another alternative preferred embodiment of the invention.

Another alternative preferred embodiment is shown in FIG. 13 and referenced as a seat assembly 250. Elements of seat assembly 250 are in common with corresponding elements of assembly 50 unless referenced otherwise. Seat assembly 250 includes a seat back 252, a set of bolsters 254 a set of horizontal reinforcing rib 255 extending between seat back 252 and seat bolsters 254 on a front side 266 of seat back 252, and a support frame with vertical ribs 270. Seat assembly 250 further includes a headrest 258. Bolsters 254 alternatively include forward edge areas 274 having a higher degree of flexibility.

Figure 14:
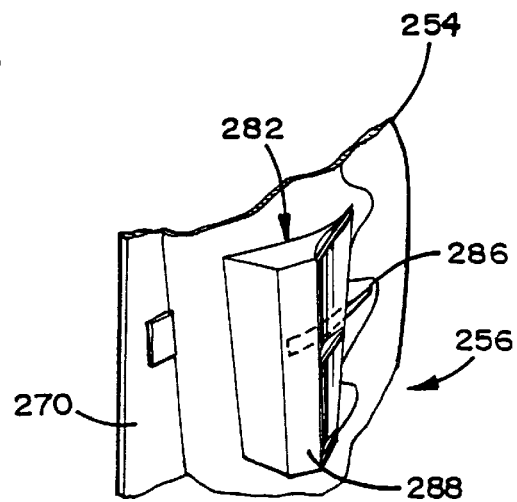
FIG. 14 is a fragmentary, rear perspective view of the bolster adjustment assembly taken in region XIV of FIG. 13.

A bolster adjustment mechanism 256 (FIG. 14) includes an adjustable reinforcing brace 282 that is slidably mounted on bolster 254. Adjustable brace 282 is slidably mounted in a track slot 286 so as to be selectively positioned along the outer surface of bolster 254. Adjustable brace 282 has a vertically elongated body and a raised land 288. Land 288 provides a surface for the user to push brace 282 along adjustment track 286. Adjustable brace 282 (FIG. 14) is elongated vertically so as to provide reinforcement along a greater vertical area than that provided by horizontally elongated adjustable brace 188 (FIG. 10). The degree of stiffening provided by bolster adjustment mechanism 254 can be determined by selecting the configuration and dimensions of adjustable brace 282, including the vertical dimension of brace 282.

Another alternative preferred embodiment is shown in FIG. 15 as a seat assembly 350. Elements of seat assembly 350 are in common with corresponding elements of assembly 50 unless referenced otherwise. Seat assembly 350 includes a seat back 352, a pair of bolsters 354, and a set of bolster adjustment mechanisms 356. Seat back 352 includes headrest 358 and has a back surface 364 and front surface 366. Seat back 352 is a molded polyurethane shell or frame with vertical ribs 370, and is mounted on a metal support frame.

In seat assembly 350, bolster adjustment mechanisms 356 are mounted on front face 366 of seat back 352. A set of integrally molded reinforcing ribs 380 span the transition between seat back 352 and bolsters 354. As shown in FIGS. 16–17, one or more of horizontal ribs 380 include a central split or notch 381 which provides a living hinge about which ribs 380 flex. A tapered positioning element 382 is slidably mounted on ribs 380 in order to operate as a position adjuster. Positioning element 382 is slidably mounted in hooked notches 383 (FIG. 17) in ribs 380. Positioning element 382 has a generally "C" shaped cross-section so as to hook over and form stops for hook notches 383.

As shown in FIGS. 15 and 16, positioning element 382 is slidably received on two vertically adjacent ribs 380. The spacing of hook notches 383 on the upper rib 380 is slightly greater than the hook notch spacing on the lower rib 380, in order to mate with the taper of positioning element 382. As a result of the taper of positioning element 382, as positioning element 382 is raised or lowered, the angular relationship of bolster 356 and seat back 352 is adjustably varied. An adjustment lever 390 (FIG. 17) extends rearwardly from the lower edge of positioning element 382. Adjustment lever 390 protrudes through a slot on seat back 352 in order to provide an adjustment lever for the user to vary the degree of support provided by bolster 356. As shown in FIG. 17, the adjustment of positioning element 382 causes the opening angle "A" on ribs 380 to vary, resulting in an adjustment on the position of bolster 356 in the direction of arrow "B." While horizontal ribs 380 which are located above and below positioning element 382 also preferably include central notches 381, the baseline firmness of bolster 354 may be increased by eliminating one or more of these additional notches 381.

Figure 19:
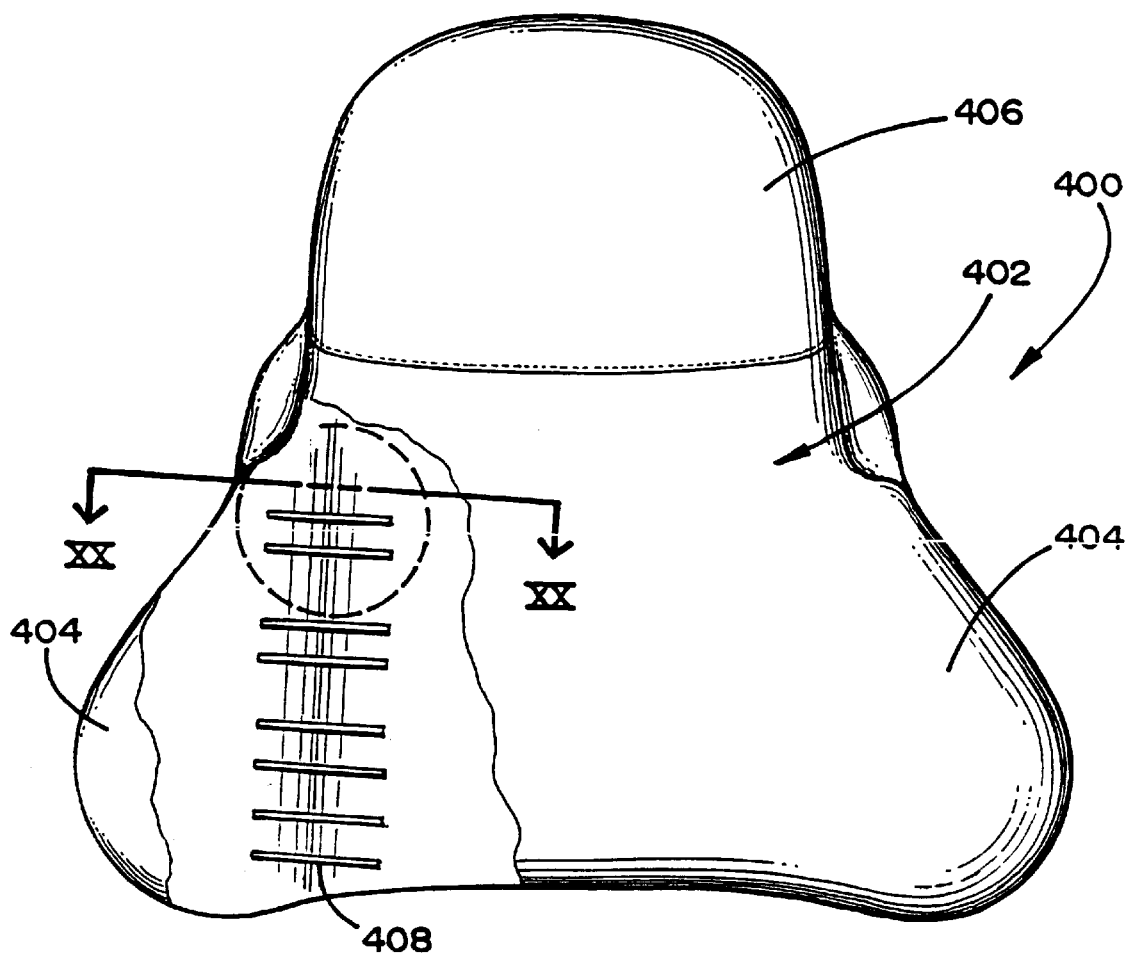
FIG. 19 is a fragmentary, front elevational view of a conventional seat back with bolsters.
Figure 20:
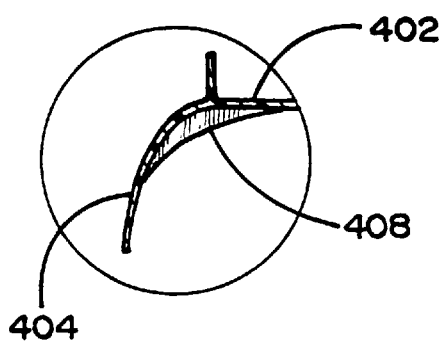
FIG. 20 is a fragmentary, cross-sectional plan view taken along plane XX—XX of FIG. 19.

A conventional seat back and bolster is shown in FIG. 19. A seat assembly 400 includes a seat back 402, a pair of bolsters 404, and a headrest 406. A series of horizontal reinforcing ribs 408 span the transition area between seat back 402 and 404.

It will be understood by one skilled in the art that the above is a description of the preferred embodiments and that various changes or modifications may be made without departing from the spirit of the invention disclosed herein. The scope of protection afforded is to be determined by claims directed to this disclosure, and the breadth of interpretation that the law allows.

The embodiments of the present invention in which an exclusive property or privilege is claimed are defined as follows:

1. A bolster adjustment mechanism for a seat, comprising:
    a bolster having a forward edge and a back surface; and
    an adjustable brace slidably mounted to the back surface of said bolster, said adjustable brace slidable toward and away from said forward edge of said bolster, said adjustable brace configured to increase the stiffness of said bolster when said adjustable brace is moved toward said forward edge of said bolster and to decrease the stiffness of said bolster when said adjustable brace is moved away from said forward edge of said bolster.

2. The bolster adjustment mechanism of claim 1, further including a lateral track slot defined in said bolster and a mounting peg disposed on said adjustable brace, wherein said adjustable brace is slidably mounted to the back surface of said bolster by insertion of said mounting peg through said track slot.

3. The bolster adjustment mechanism of claim 2, wherein said mounting peg is a split peg and includes an enlarged head.

4. The bolster adjustment mechanism of claim 1, wherein said adjustable brace includes a pair of enlarged flanges which provide increased stiffening reinforcement of said bolster.

5. The bolster adjustment mechanism of claim 1, wherein said adjustable brace includes an elongated body which provides increased stiffening reinforcement of said bolster.

6. The bolster adjustment mechanism of claim 1, wherein said adjustable brace includes a raised land which allows a user of said bolster adjustment mechanism to move said adjustable brace.

* * * * *